United States Patent
Shi et al.

(10) Patent No.: US 11,743,247 B2
(45) Date of Patent: *Aug. 29, 2023

(54) CROSS DEVICE SINGLE SIGN-ON

(71) Applicant: Citrix Systems, Inc., Ft. Lauderdale, FL (US)

(72) Inventors: Liangang Shi, Nanjing (CN); Rulei Lin, Nanjing (CN); Zhenxing Liu, Nanjing (CN)

(*) Notice: Subject to any disclaimer, the term of this patent is extended or adjusted under 35 U.S.C. 154(b) by 41 days.

This patent is subject to a terminal disclaimer.

(21) Appl. No.: 17/448,558

(22) Filed: Sep. 23, 2021

(65) Prior Publication Data

US 2022/0006803 A1 Jan. 6, 2022

Related U.S. Application Data

(63) Continuation of application No. 16/935,453, filed on Jul. 22, 2020, now Pat. No. 11,159,512, which is a continuation of application No. PCT/CN2020/091557, filed on May 21, 2020.

(51) Int. Cl.
   *H04L 9/40* (2022.01)
(52) U.S. Cl.
   CPC ........ *H04L 63/0815* (2013.01); *H04L 63/083* (2013.01); *H04L 63/123* (2013.01)
(58) Field of Classification Search
   CPC . H04L 63/0815; H04L 63/083; H04L 63/123; H04L 63/807
   See application file for complete search history.

(56) References Cited

U.S. PATENT DOCUMENTS

| | | | | |
|---|---|---|---|---|
| 7,174,383 B1* | 2/2007 | Biswas | ............... | H04L 63/0815 709/229 |
| 7,496,954 B1* | 2/2009 | Himawan | ............... | G06F 21/41 726/8 |
| 8,145,909 B1* | 3/2012 | Agrawal | ............... | H04L 9/3247 713/180 |

(Continued)

FOREIGN PATENT DOCUMENTS

| | | |
|---|---|---|
| CN | 102546570 A | 7/2012 |
| CN | 107070880 A | 8/2017 |

OTHER PUBLICATIONS

International Search Report and Written Opinion for PCT Application No. PCT/CN2020/091557 dated Feb. 8, 2021 9 pages.

*Primary Examiner* — Aravind K Moorthy

(57) ABSTRACT

Systems and methods for providing a single sign-on for authenticating a user via multiple client devices is provided. For example, the system includes a processor configured to receive a first connection request from a first client device. The processor processes the first connection request and transmits an access token to the first client. The processor can further receive a second connection request from a second client device and process the second connection request. The processor can transmit a single sign-on response to the second client device in reply to the second connection request. The second client device can be configured to communicated with and transmit the single-sign on response to the first client device for processing. The processor can receive a single sign-on verification from the first client device, process the single sign-on verification, and transmit a copy of the access token to the second client device.

14 Claims, 9 Drawing Sheets

(56) References Cited

U.S. PATENT DOCUMENTS

| | | | | |
|---|---|---|---|---|
| 8,613,070 B1* | 12/2013 | Borzycki | H04L 67/104 | 726/8 |
| 8,824,664 B1* | 9/2014 | Ristock | H04L 63/08 | 379/266.03 |
| 8,943,571 B2* | 1/2015 | Paddon | H04W 4/02 | 726/8 |
| 8,977,857 B1* | 3/2015 | Triscon | H04L 9/3213 | 726/28 |
| 8,996,857 B1* | 3/2015 | Akella | G06F 21/41 | 713/153 |
| 9,065,819 B1* | 6/2015 | Shanmugam | G06F 21/41 | |
| 9,143,482 B1* | 9/2015 | Breau | H04L 63/08 | |
| 9,148,460 B1* | 9/2015 | Sun | H04L 67/55 | |
| 9,173,101 B1* | 10/2015 | Angelov | H04L 63/08 | |
| 9,397,980 B1* | 7/2016 | Chen | G06F 21/33 | |
| 9,525,684 B1* | 12/2016 | Brandwine | H04L 63/083 | |
| 9,754,100 B1* | 9/2017 | Hitchcock | H04L 9/0891 | |
| 9,769,122 B2* | 9/2017 | Winner | H04L 63/0815 | |
| 9,819,665 B1* | 11/2017 | Machani | H04L 63/08 | |
| 9,819,672 B1* | 11/2017 | Machani | H04L 63/0853 | |
| 9,847,990 B1* | 12/2017 | de Boursetty | H04L 9/3236 | |
| 10,055,578 B1* | 8/2018 | Marquardt | G06F 21/44 | |
| 10,382,203 B1* | 8/2019 | Loladia | H04L 63/06 | |
| 10,757,104 B1* | 8/2020 | Goel | H04L 63/08 | |
| 10,757,258 B1* | 8/2020 | Hardebeck | H04L 65/1076 | |
| 10,855,664 B1* | 12/2020 | Ziraknejad | H04W 4/02 | |
| 10,868,808 B1* | 12/2020 | Hohler | H04L 63/0807 | |
| 10,873,572 B1* | 12/2020 | Krishna | H04L 67/34 | |
| 10,963,868 B1* | 3/2021 | McCauley | G06Q 20/3267 | |
| 11,063,926 B1* | 7/2021 | Narayanan | H04W 12/068 | |
| 11,080,385 B1* | 8/2021 | Angara | H04W 12/068 | |
| 11,140,157 B1* | 10/2021 | Xia | H04L 63/0853 | |
| 11,159,512 B1 | 10/2021 | Shi et al. | | |
| 11,196,732 B2* | 12/2021 | Hardt | H04L 63/205 | |
| 11,240,225 B1* | 2/2022 | Seever | H04L 63/0815 | |
| 11,252,190 B1* | 2/2022 | Sharifi Mehr | H04L 63/10 | |
| 2002/0176582 A1* | 11/2002 | Aull | H04L 9/3247 | 380/279 |
| 2003/0163733 A1* | 8/2003 | Barriga-Caceres | H04L 67/51 | 726/5 |
| 2003/0188193 A1* | 10/2003 | Venkataramappa | H04L 63/0815 | 726/10 |
| 2004/0098595 A1* | 5/2004 | Aupperle | H04L 63/0815 | 713/185 |
| 2005/0055555 A1* | 3/2005 | Rao | G06F 21/41 | 713/182 |
| 2005/0096048 A1* | 5/2005 | Clare | H04W 12/062 | 455/433 |
| 2005/0138362 A1* | 6/2005 | Kelly | H04L 63/0807 | 713/156 |
| 2005/0283614 A1* | 12/2005 | Hardt | H04L 9/321 | 713/182 |
| 2006/0005234 A1* | 1/2006 | Birk | H04L 9/40 | 726/9 |
| 2006/0015727 A1* | 1/2006 | Birk | H04L 63/0281 | 713/171 |
| 2006/0031494 A1* | 2/2006 | Marcus | H04L 67/02 | 709/225 |
| 2006/0031683 A1* | 2/2006 | Marion | G06F 21/335 | 713/185 |
| 2006/0206930 A1* | 9/2006 | Parashi | G06F 21/41 | 726/8 |
| 2006/0230438 A1* | 10/2006 | Shappir | H04L 63/0815 | 726/8 |
| 2007/0101440 A1* | 5/2007 | Bhatia | G06F 21/552 | 726/28 |
| 2007/0118886 A1* | 5/2007 | Martin | H04L 63/0435 | 726/5 |
| 2007/0118890 A1* | 5/2007 | Song | H04L 9/3213 | 726/8 |
| 2007/0162581 A1* | 7/2007 | Maes | H04L 67/53 | 709/223 |
| 2007/0186106 A1* | 8/2007 | Ting | H04L 63/0815 | 713/168 |
| 2008/0092215 A1* | 4/2008 | Soukup | H04L 63/0815 | 726/5 |
| 2008/0141028 A1* | 6/2008 | Wei | H04L 63/0815 | 713/180 |
| 2009/0249440 A1* | 10/2009 | Platt | H04L 63/0815 | 726/1 |
| 2009/0292927 A1* | 11/2009 | Wenzel | H04L 63/0815 | 726/8 |
| 2010/0043065 A1* | 2/2010 | Bray | G06F 21/41 | 715/764 |
| 2010/0122333 A1* | 5/2010 | Noe | H04L 63/0815 | 726/8 |
| 2010/0125894 A1* | 5/2010 | Yasrebi | H04L 12/2818 | 726/4 |
| 2010/0138905 A1* | 6/2010 | Kass | H04L 63/18 | 726/7 |
| 2010/0154046 A1* | 6/2010 | Liu | H04L 63/0815 | 726/8 |
| 2010/0174758 A1* | 7/2010 | Radenkovic | G06F 21/41 | 707/E17.005 |
| 2010/0250957 A1* | 9/2010 | Cuppett | G06F 21/41 | 713/186 |
| 2010/0306547 A1* | 12/2010 | Fallows | H04L 63/0815 | 713/178 |
| 2010/0325441 A1* | 12/2010 | Laurie | H04L 9/3257 | 713/185 |
| 2011/0078437 A1* | 3/2011 | Reddy | H04L 63/0815 | 726/8 |
| 2011/0107409 A1* | 5/2011 | Wilkinson | H04L 63/0428 | 726/8 |
| 2011/0145565 A1* | 6/2011 | Kol | H04L 51/00 | 713/170 |
| 2011/0202989 A1* | 8/2011 | Otranen | H04W 12/068 | 726/8 |
| 2011/0209202 A1* | 8/2011 | Otranen | H04L 63/0876 | 726/8 |
| 2011/0265172 A1* | 10/2011 | Sharma | H04L 63/0815 | 726/8 |
| 2011/0314532 A1* | 12/2011 | Austin | H04L 63/0892 | 726/8 |
| 2011/0314533 A1* | 12/2011 | Austin | H04L 63/08 | 726/9 |
| 2012/0084570 A1* | 4/2012 | Kuzin | H04L 63/0815 | 726/8 |
| 2012/0131343 A1* | 5/2012 | Choi | H04L 63/0815 | 713/168 |
| 2012/0216267 A1* | 8/2012 | Austel | H04L 67/563 | 726/8 |
| 2012/0229838 A1* | 9/2012 | Mogaki | G06F 21/608 | 358/1.14 |
| 2012/0291114 A1* | 11/2012 | Poliashenko | G06F 21/44 | 726/8 |
| 2012/0297472 A1* | 11/2012 | Tamura | H04L 63/0815 | 726/8 |
| 2013/0007869 A1* | 1/2013 | Thomas | G06F 21/41 | 726/9 |
| 2013/0047240 A1* | 2/2013 | Radhakrishnan | H04L 63/105 | 726/9 |
| 2013/0047249 A1* | 2/2013 | Radhakrishnan | H04L 63/0807 | 726/12 |
| 2013/0047266 A1* | 2/2013 | Radhakrishnan | H04L 63/105 | 726/28 |
| 2013/0067229 A1* | 3/2013 | German | H04L 63/0846 | 713/171 |
| 2013/0086669 A1* | 4/2013 | Sondhi | H04W 12/068 | 726/8 |
| 2013/0086670 A1* | 4/2013 | Vangpat | H04L 63/0815 | 726/8 |
| 2013/0244614 A1* | 9/2013 | Santamaria | H04W 12/069 | 455/411 |
| 2013/0254847 A1* | 9/2013 | Adams | G06F 21/6218 | 726/4 |
| 2013/0305338 A1* | 11/2013 | Casals Andreu | H04L 63/0815 | 726/8 |

(56) References Cited

U.S. PATENT DOCUMENTS

| | | | |
|---|---|---|---|
| 2014/0020073 A1* | 1/2014 | Ronda | H04L 63/0853 726/7 |
| 2014/0020078 A1* | 1/2014 | Canning | H04L 63/0884 726/8 |
| 2014/0068702 A1* | 3/2014 | Hyndman | H04L 63/0815 726/1 |
| 2014/0082715 A1* | 3/2014 | Grajek | H04W 12/068 726/8 |
| 2014/0130136 A1* | 5/2014 | Chaplik | H04L 63/0815 726/4 |
| 2014/0187190 A1* | 7/2014 | Schuler | H04W 12/084 455/404.1 |
| 2014/0189781 A1* | 7/2014 | Manickam | H04W 4/50 726/1 |
| 2014/0189840 A1* | 7/2014 | Metke | H04L 63/0815 726/9 |
| 2014/0241212 A1* | 8/2014 | Janardhanan | H04L 49/55 370/255 |
| 2014/0250511 A1* | 9/2014 | Kendall | G06F 21/44 726/6 |
| 2014/0258547 A1* | 9/2014 | Scavo | H04L 9/40 709/227 |
| 2014/0259134 A1* | 9/2014 | Scavo | H04L 63/0815 709/201 |
| 2014/0282940 A1* | 9/2014 | Williams | H04L 63/0807 726/6 |
| 2014/0282972 A1* | 9/2014 | Fan | H04L 63/0815 726/7 |
| 2014/0282983 A1* | 9/2014 | Ju | H04W 12/068 726/8 |
| 2014/0310792 A1* | 10/2014 | Hyland | H04L 63/0815 726/8 |
| 2014/0359709 A1* | 12/2014 | Nassar | H04L 67/148 726/4 |
| 2014/0366110 A1* | 12/2014 | Huhn | H04L 63/0815 709/217 |
| 2015/0012995 A1* | 1/2015 | Korat | H04L 63/0815 726/8 |
| 2015/0088978 A1* | 3/2015 | Motukuru | H04L 67/148 709/203 |
| 2015/0089614 A1* | 3/2015 | Mathew | H04L 65/1069 726/7 |
| 2015/0135296 A1* | 5/2015 | Cason | G06F 21/6227 726/8 |
| 2015/0188907 A1* | 7/2015 | Khalid | H04L 63/0815 726/8 |
| 2015/0237049 A1* | 8/2015 | Grajek | H04L 67/02 726/7 |
| 2015/0244704 A1* | 8/2015 | Morrissey | H04L 67/02 726/8 |
| 2015/0244706 A1* | 8/2015 | Grajek | H04L 63/0815 726/6 |
| 2015/0326542 A1* | 11/2015 | Serebrin | H04L 9/0822 713/160 |
| 2015/0326562 A1* | 11/2015 | Belote | H04L 63/0815 726/4 |
| 2015/0350186 A1* | 12/2015 | Chan | H04L 63/0815 726/9 |
| 2015/0381621 A1 | 12/2015 | Innes et al. | |
| 2016/0021097 A1* | 1/2016 | Shrotri | H04L 63/0815 726/8 |
| 2016/0021098 A1* | 1/2016 | Dhanabalan | H04L 63/0823 726/8 |
| 2016/0044040 A1* | 2/2016 | Caffary, Jr. | H04L 63/08 726/4 |
| 2016/0044511 A1* | 2/2016 | Broch | H04L 63/0853 726/4 |
| 2016/0050193 A1* | 2/2016 | Kanov | H04W 12/069 726/7 |
| 2016/0094540 A1* | 3/2016 | Camenisch | H04L 9/085 726/8 |
| 2016/0094554 A1* | 3/2016 | Sugiura | H04L 63/10 726/4 |
| 2016/0119323 A1* | 4/2016 | Krishna | G06F 21/41 726/8 |
| 2016/0164860 A1* | 6/2016 | Dunne | H04L 63/0815 726/8 |
| 2016/0180333 A1* | 6/2016 | Leyva | G06Q 20/363 705/41 |
| 2016/0197962 A1* | 7/2016 | Winn | H04L 63/0823 713/168 |
| 2016/0301691 A1* | 10/2016 | Miller | H04L 63/0815 |
| 2016/0306955 A1* | 10/2016 | Martin | G06F 21/34 |
| 2016/0308858 A1* | 10/2016 | Nordstrom | H04L 63/083 |
| 2016/0381000 A1* | 12/2016 | Mathew | H04L 63/0815 726/4 |
| 2017/0006020 A1* | 1/2017 | Falodiya | G06F 8/61 |
| 2017/0026361 A1* | 1/2017 | Jayakumar | H04L 63/0807 |
| 2017/0026362 A1* | 1/2017 | O'Donnell | H04L 63/0807 |
| 2017/0034152 A1* | 2/2017 | Subramanya | H04L 63/101 |
| 2017/0093840 A1* | 3/2017 | Forguson | H04L 63/0428 |
| 2017/0099280 A1* | 4/2017 | Goel | H04L 67/146 |
| 2017/0111351 A1* | 4/2017 | Grajek | H04L 63/083 |
| 2017/0116424 A1* | 4/2017 | Aamir | G06F 21/606 |
| 2017/0118218 A1* | 4/2017 | Koottayi | H04L 63/102 |
| 2017/0149803 A1* | 5/2017 | Lo | H04L 63/123 |
| 2017/0187708 A1* | 6/2017 | Moore | H04L 63/0807 |
| 2017/0250812 A1* | 8/2017 | Schefenacker | H04L 63/062 |
| 2017/0289134 A1* | 10/2017 | Bradley | H04L 63/105 |
| 2017/0351542 A1* | 12/2017 | Robinson | G06F 9/466 |
| 2018/0034797 A1* | 2/2018 | Chao | H04L 63/083 |
| 2018/0063122 A1* | 3/2018 | Enoki | H04L 63/0815 |
| 2018/0069702 A1* | 3/2018 | Ayyadevara | H04W 12/069 |
| 2018/0075231 A1* | 3/2018 | Subramanian | H04L 63/0807 |
| 2018/0077138 A1* | 3/2018 | Bansal | G06Q 20/325 |
| 2018/0077144 A1* | 3/2018 | Gangawane | H04L 63/102 |
| 2018/0082289 A1* | 3/2018 | Johnson | G06F 21/6245 |
| 2018/0131684 A1* | 5/2018 | Standefer, III | G06F 3/0622 |
| 2018/0139199 A1* | 5/2018 | Ahuja | H04L 67/306 |
| 2018/0159843 A1* | 6/2018 | Sajja | H04L 9/0894 |
| 2018/0167378 A1* | 6/2018 | Kostyukov | H04L 63/0815 |
| 2018/0176212 A1* | 6/2018 | Nair | H04L 63/0838 |
| 2018/0219854 A1* | 8/2018 | Miran | H04L 63/0815 |
| 2018/0255047 A1* | 9/2018 | Cicchitto | H04L 63/083 |
| 2018/0270220 A1* | 9/2018 | Jensen | G16H 10/60 |
| 2018/0295134 A1* | 10/2018 | Gupta | H04L 67/02 |
| 2018/0314817 A1* | 11/2018 | Gadde | G06F 21/6218 |
| 2018/0324173 A1* | 11/2018 | Ananthapur Bache | H04L 63/0815 |
| 2019/0014102 A1* | 1/2019 | Mathew | G06F 21/41 |
| 2019/0028462 A1* | 1/2019 | Ishikawa | H04L 63/102 |
| 2019/0081942 A1* | 3/2019 | Suresh | H04L 63/0815 |
| 2019/0109857 A1* | 4/2019 | Caffary, Jr. | G06F 16/176 |
| 2019/0124070 A1* | 4/2019 | Engan | H04L 9/3234 |
| 2019/0132321 A1* | 5/2019 | Pitchaimani | H04L 63/102 |
| 2019/0163896 A1* | 5/2019 | Balaraman | H04L 63/0815 |
| 2019/0174304 A1* | 6/2019 | Tunnell | H04W 12/50 |
| 2019/0199707 A1* | 6/2019 | Hinton | H04L 63/0815 |
| 2019/0205559 A1* | 7/2019 | Gupta | H04L 67/1097 |
| 2019/0230081 A1* | 7/2019 | Singh | H04L 63/10 |
| 2019/0230169 A1* | 7/2019 | Elangovan | H04L 67/01 |
| 2019/0245843 A1* | 8/2019 | Ja | G06F 21/41 |
| 2019/0289059 A1* | 9/2019 | Vanahalli | H04L 63/061 |
| 2019/0342280 A1* | 11/2019 | Shaw | H04L 63/0807 |
| 2019/0342281 A1* | 11/2019 | Shaw | H04L 9/3228 |
| 2019/0372962 A1* | 12/2019 | Maria | H04L 63/108 |
| 2019/0386980 A1* | 12/2019 | Kludy | H04L 9/3213 |
| 2019/0394187 A1* | 12/2019 | Fletcher | H04W 8/18 |
| 2020/0007530 A1* | 1/2020 | Mohamad Abdul | H04W 12/009 |
| 2020/0021574 A1* | 1/2020 | Pinner | H04L 63/102 |
| 2020/0099675 A1* | 3/2020 | Mardiks Rappaport | H04L 63/1466 |
| 2020/0099676 A1* | 3/2020 | Desarda | G06F 16/90335 |
| 2020/0127994 A1* | 4/2020 | Kukreja | G06F 21/31 |
| 2020/0133955 A1* | 4/2020 | Padmanabhan | G06Q 30/01 |
| 2020/0137042 A1* | 4/2020 | Kannan, III | H04L 63/083 |
| 2020/0137440 A1* | 4/2020 | Zavesky | H04N 21/23418 |
| 2020/0153815 A1* | 5/2020 | Yehuda | H04L 63/0815 |

(56) References Cited

U.S. PATENT DOCUMENTS

| | | | | |
|---|---|---|---|---|
| 2020/0162255 | A1* | 5/2020 | Hunt | H04L 63/083 |
| 2020/0162454 | A1* | 5/2020 | Jain | H04L 63/0853 |
| 2020/0177576 | A1* | 6/2020 | Vudathu | H04L 63/0815 |
| 2020/0257700 | A1* | 8/2020 | Xu | G06F 8/65 |
| 2020/0265062 | A1* | 8/2020 | Srinivasan | H04L 67/53 |
| 2020/0372149 | A1* | 11/2020 | Di Pietro | H04L 9/085 |
| 2021/0034748 | A1* | 2/2021 | Ahmed | G06F 21/572 |
| 2021/0081521 | A1* | 3/2021 | Deng | H04L 67/02 |
| 2021/0084024 | A1* | 3/2021 | Sadayoshi | G06F 9/451 |
| 2021/0084031 | A1* | 3/2021 | Lao | H04W 12/06 |
| 2021/0099449 | A1* | 4/2021 | Frederick | H04L 63/0807 |
| 2021/0124812 | A1* | 4/2021 | Stolbikov | H04L 9/3218 |
| 2021/0126910 | A1* | 4/2021 | Chauhan | H04L 63/0815 |
| 2021/0176229 | A1* | 6/2021 | Xuan | H04L 63/0853 |
| 2021/0176236 | A1* | 6/2021 | Dimitrov | G06F 21/33 |
| 2021/0201279 | A1* | 7/2021 | Mossler | G06Q 20/4014 |
| 2021/0203653 | A1* | 7/2021 | Kochhar | H04L 63/20 |
| 2021/0216612 | A1* | 7/2021 | Wojcik | G06F 21/64 |
| 2021/0218567 | A1* | 7/2021 | Richards | H04L 9/3297 |
| 2021/0258298 | A1* | 8/2021 | Pattar | H04L 63/0428 |
| 2021/0289047 | A1* | 9/2021 | Pathak | H04L 67/01 |
| 2021/0306323 | A1* | 9/2021 | Suraparaju | H04L 67/10 |
| 2021/0314311 | A1* | 10/2021 | Metwalli | G06F 21/41 |
| 2021/0320911 | A1* | 10/2021 | AlDarazi | H04L 9/0643 |
| 2021/0365968 | A1* | 11/2021 | Narula | G06F 16/285 |

* cited by examiner

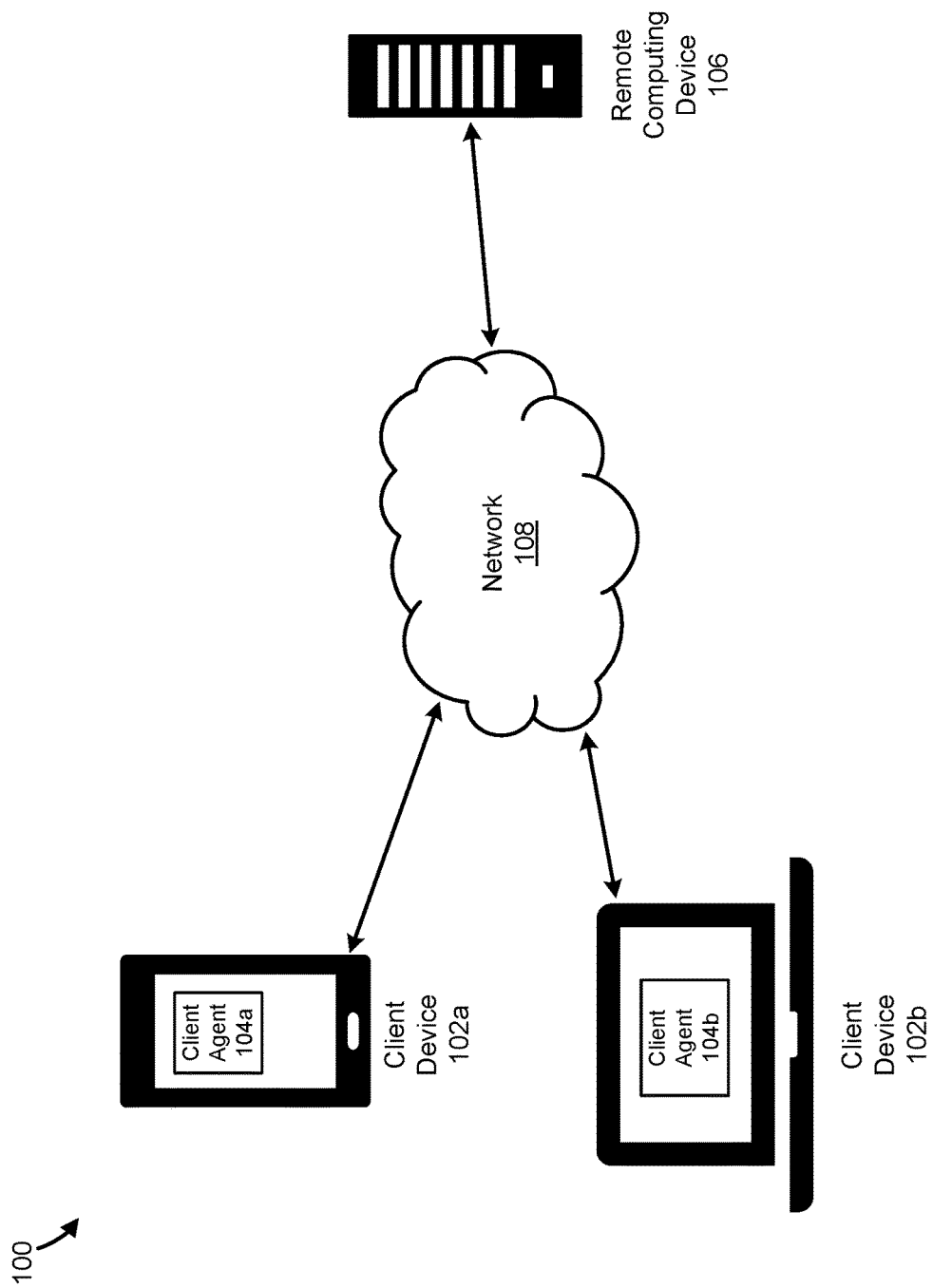

CROSS DEVICE SINGLE SIGN-ON

CROSS-REFERENCE TO RELATED APPLICATION

This application claims the benefit under 35 U.S.C. § 120 as a continuation of U.S. patent application Ser. No. 16/935,453, titled "CROSS DEVICE SINGLE SIGN-ON", filed on Jul. 22, 2020, which claims the benefit under 35 U.S.C. § 120 as a continuation of PCT Application No. PCT/CN2020/091557, titled "CROSS DEVICE SINGLE SIGN-ON", filed on May 21, 2020, which designates the United States. The aforementioned applications are hereby incorporated herein by reference in their entireties.

BACKGROUND

Access to remote resources such as remotely accessible applications generally requires a specific level of security to prevent malicious users from accessing the resources. For example, a user wishing to access a resource such as a distributed workspace may be required to provide a username and password combination to access the resource. In some examples, a multi-factor authentication process such as a two-factor authentication process may be used in which the user accessing the resource is required to provide additional information during an authentication process. In the event that the user wishes to access the resource on another device, the user has to repeat the complete authentication process a second time, potentially wasting the user's time and lowering their efficiency.

SUMMARY

In at least one example, a computer system for providing a single sign-on for authenticating a user via multiple client devices in a distributed resource environment is provided. The computer system includes a memory, a network interface, and at least one processor coupled to the memory and the network interface. The at least one processor is configured to receive, via the network interface, a first connection request from a first client device, process the first connection request, transmit, via the network interface, an access token to the first client device in reply to the first connection request, receive, via the network interface, a second connection request from a second client device, process the second connection request, transmit, via the network interface, a single sign-on response to the second client device in reply to the second connection request, receive, via the network interface, a single sign-on verification from the first client device, process the single sign-on verification, and transmit, via the network interface, a copy of the access token to the second client device.

Implementations of the computer system can include one or more of the following features.

In the computer system, the at least one processor can be configured to process the first connection request by being configured to extract authentication data from the first connection request, verify the authentication data for the user of the first client device, and generate the access token based upon verification of the authentication data. In some examples, the authentication data can include authentication data received from the first client device during a multi-factor authentication process.

In the computer system, the at least one processor can be configured to process the second connection request by being configured to determine that the second connection request is a single sign-on request, generate unique session identifier information for the single sign-on request, store the unique session identifier information in the memory, and generate the single sign-on response based upon the unique session identifier information.

In the computer system, the at least one processor can be configured to process the single sign-on verification by being configured to extract a copy of the access token from the single sign-on verification, verify the copy of the access token, extract session identifier response information from the single sign-on verification, compare the extracted session identifier response information and the stored unique session identifier information, and authenticate the user of the second client device based upon verification of the copy of the access token and the comparison of the extracted session identifier response information and the stored unique session identifier information.

In the computer system, the at least one processor can be further configured to transmit, via the network interface, an updated access token to at least one of the first client device and the second client device.

In the computer system, the first client device and the second client device can be assigned to and/or belong to the user.

In another example, a method of providing a single sign-on for authenticating a user via multiple client devices in a distributed resource environment is provided. The method includes receiving, by at least one processor, a first connection request from a first client device; processing, by at least one processor, the first connection request; transmitting, by at least one processor, an access token to the first client device in reply to the first connection request; receiving, by at least one processor, a second connection request from a second client device; processing, by at least one processor, the second connection request; transmitting, by at least one processor, a single sign-on response to the second client device in reply to the second connection request; receiving, by at least one processor, a single sign-on verification from the first client device; processing, by at least one processor, the single sign-on verification; and transmitting, by at least one processor, a copy of the access token to the second client device.

Implementations of the method of providing a single sign-on for authenticating a user via multiple client devices in a distributed resource environment can include one or more of the following features.

In the method, processing the first connection request can include extracting, by at least one processor, authentication data from the first connection request; verifying, by at least one processor, the authentication data for the user of the first client device; and generating, by at least one processor, the access token based upon verification of the authentication data. In some examples, the authentication data can include authentication data received from the first client device during a multi-factor authentication process.

In the method, processing the second connection request can include determining, by at least one processor, that the second connection request is a single sign-on request; generating, by at least one processor, unique session identifier information for the single sign-on request; storing, by at least one processor, the unique session identifier information in a memory operably coupled to the at least one processor; and generating, by at least one processor, the single sign-on response based upon the unique session identifier information. In some examples, processing the single sign-on verification can include extracting, by at least one processor, a copy of the access token from the single sign-on verification;

verifying, by at least one processor, the copy of the access token; extracting, by at least one processor, session identifier response information from the single sign-on verification; comparing, by at least one processor, the extracted session identifier response information and the stored unique session identifier information; and authenticating, by at least one processor, the user of the second client device based upon verification of the copy of the access token and the comparison of the extracted session identifier response information and the stored unique session identifier information.

In some examples, the method can further include transmitting, by at least one processor, an updated access token to at least one of the first client device and the second client device.

In the method. the first client device and the second client device can be assigned to and/or belong to the user.

In another example, a second computer system for providing a single sign-on for authenticating a user via multiple client devices in a distributed resource environment is provided. The second computing system includes a first client device configured to execute a first client agent for authenticating the user of the first client device, a second client device configured to execute a second client agent for authenticating the user of the second client device; and a remote computing device. The remote computing device includes a memory, a network interface configured to communicate with the first client device and the second client device, and at least one processor coupled to the memory and the network interface and configured to receive, via the network interface, a first connection request from the first client agent, process the first connection request, transmit, via the network interface, an access token to the first client device in reply to the first connection request, receive, via the network interface, a second connection request from the second client agent, process the second connection request, transmit, via the network interface, a single sign-on response to the second client device in reply to the second connection request, receive, via the network interface, a single sign-on verification from the first client device, process the single sign-on verification, and transmit, via the network interface, a copy of the access token to the second client device.

Implementations of the second computer system can include one or more of the following features.

In the second computer system, the second client device can be further configured to receive the single sign-on response from the remote computing device, establish an operable connection with the first client device, and transmit the single sign-on response to the first client device. In some examples, the first client device can be further configured to receive the single sign-on request from the second client device, process the single sign-on request, generate a single sign-on verification in response to processing the single sign-on request, and transmit the single sign-on verification to the remote computing device.

In the second computer system, the at least one processor can be configured to process the first connection request by being configured to extract authentication data from the first connection request, verify the authentication data for the user of the first client device, and generate the access token based upon verification of the authentication data.

In the second computer system, the at least one processor can be configured to process the second connection request by being configured to determine that the second connection request is a single sign-on request, generate unique session identifier information for the single sign-on request, store the unique session identifier information in the memory, and generate the single sign-on response based upon the unique session identifier information. In some examples, the at least one processor can be configured to process the single sign-on verification by being configured to extract a copy of the access token from the single sign-on verification, verify the copy of the access token, extract session identifier response information from the single sign-on verification, compare the extracted session identifier response information and the stored unique session identifier information, and authenticate the user of the second client device based upon verification of the copy of the access token and the comparison of the extracted session identifier response information and the stored unique session identifier information.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

FIG. 1 is a block diagram of a system architecture for accessing a remote computing device by multiple client devices.

DETAILED DESCRIPTION

Figure 2A:
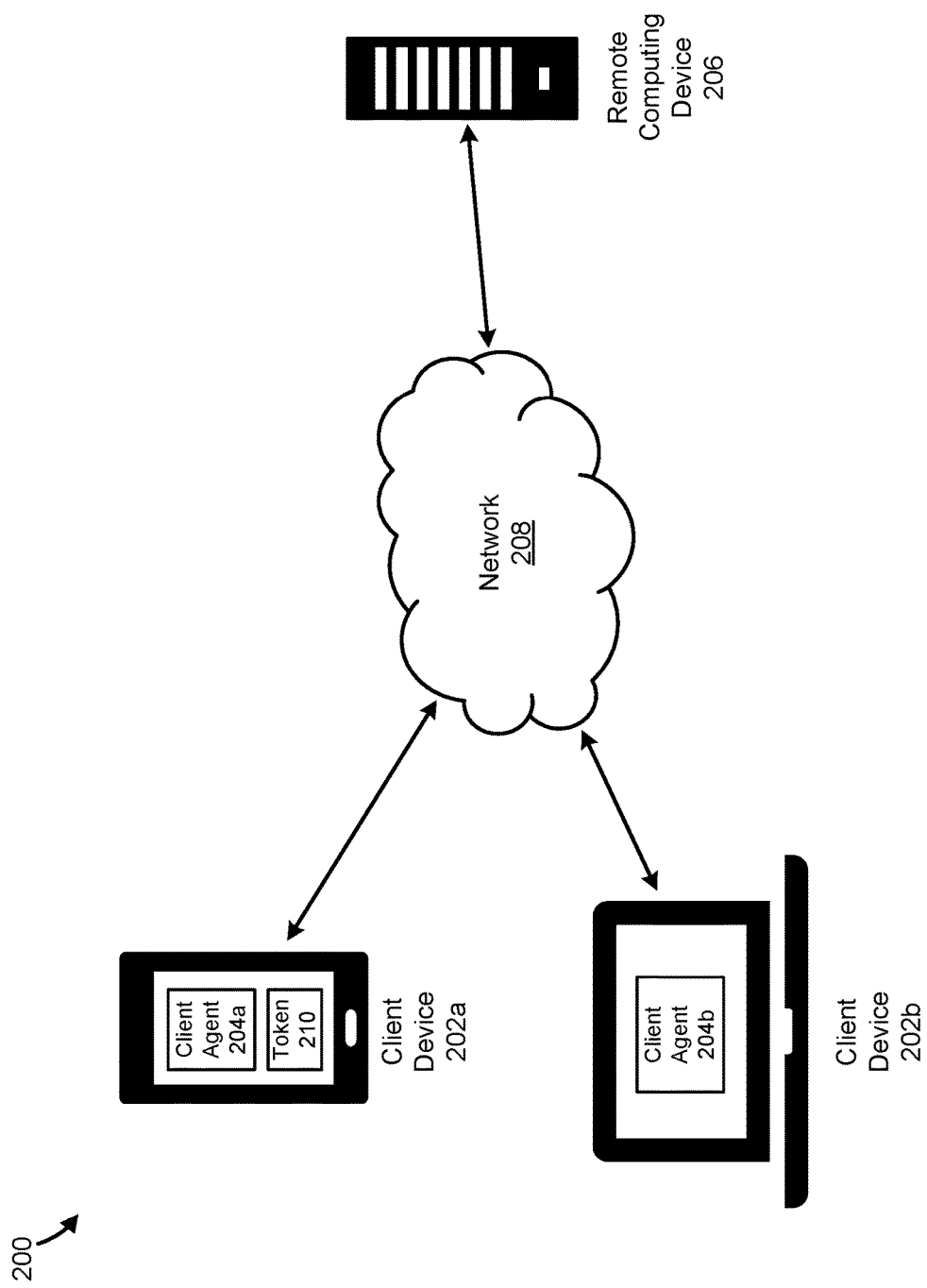
FIGS. 2A and 2B illustrate a sample system architecture including multiple client devices connecting to a remote computing device using a single sign-on request, in accordance with at least one example of the present disclosure.

As summarized above, various examples described herein are directed to systems and methods for providing a cross device single sign-on technique for authenticating a user of multiple client computing devices. The single sign-on technique uses communications between a first client computing device to which a user is authenticated to authenticate the user to a second client computing device to which the user is not currently authenticated. The single sign-on technique as described herein works to reduce the overall steps required to authenticate the user to both the first client computing device and the second client computing device. These systems and methods overcome drawbacks that arise in other techniques for authenticating users of multiple client computing devices wherein, for example, a user wishing to access remotely located resources on multiple client computing devices is required to perform a full authentication on each client computing device. When using a multi-factor authentication process, authenticating the user on each client computing device can require excessive time and user input. In such an environment, a user may be motivated to use a single client computing device for multiple tasks, even if the client computing device is not well suited or optimized for such tasks.

To improve a user's experience with authentication of multiple client computing devices that belong to or are otherwise assigned to the user, the systems and methods as described herein may include providing an access token for remote resource access. A remote computing device controls and distributes the access token, or copies of the access token, to multiple client computing devices. For example, the remote computing device can authenticate a user of a first client computing device using standard authentication techniques and provide the first client computing device with an access token. Subsequent requests from the user at additional client computing devices can be structured as a single sign-on request transmitted to the remote computing device. The remote computing device can be configured to process a single sign-on request as described herein in such a manner that a modified authentication process is used to authenticate the user at a second client computing device. Upon verification of the user at the second client computing device, the remote computing device can forward the access token, or a copy of the access token, to the second client computing device as well, thereby authenticating the user at the second client computing device and providing the second client computing device with access to the remote resources.

Thus, and in accordance with at least some examples disclosed herein, single sign-on request systems and methods are provided that include improved authentication of a user at multiple client computing devices owned by or otherwise assigned to the same user. These systems and methods enhance the quality of a user's experience by minimizing the time taken to authenticate subsequent client computing devices after authentication of a first client computing device.

In some examples, a processor associated with a server included in, for example, a distributed workspace system, can be configured to receive a first connection request from a first client computing device. The processor can process the first connection request to authenticate a user of the first client computing device and transmit an access token to the first client computing device upon successful authentication. The processor can also receive a second connection request from a second and previously unauthenticated client device. The processor can process the second connection request and transmit a single sign-on response to the second client computing device. The second client computing device can be configured to receive and process the single sign-on response and transfer information from the response to the first client computing device via a secure connection between the first and second client computing devices. The first client computing device can be configured to process the information and provide a single sign-on verification to the processor associated with the server. The processor can receive the single sign-on verification from the first client computing device, process the single sign-on verification, and transmit the access token to the second client computing device.

Examples of the methods, systems, and processes discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Sample Computing Systems

In some examples, a distributed system is configured to implement workspace and system access to remote users, thereby providing a central repository of applications, files, and other similar resources to a group of trusted users. A digital workspace can be implemented as a software framework designed to deliver and manage a user's applications, data, and desktops in a consistent and secure manner, regardless of the user's device or location. Digital workspaces enhance the user experience by streamlining and automating those tasks that a user performs frequently, such as approving expense reports, confirming calendar appointments, submitting helpdesk tickets, and reviewing vacation requests. A digital workspace allows users to access functionality provided by multiple enterprise applications—including "software as a service" (SaaS) applications, web applications, desktop applications, and proprietary applications—through a single interface.

FIG. 1 illustrates a logical architecture of one implementation of, for example, a distributed workspace system 100 that is configured to connect one or more client devices with one or more remote computing devices configured to host shared resources such as applications accessible via the distributed workspace. As shown in FIG. 1, the system 100 can include a client device 102a and a client device 102b. In certain implementations, each of the client devices 102a and 102b can belong to or otherwise be assigned to the same user. For example, as shown in FIG. 1, client device 102a can be a user's cellphone and client device 102b can be the user's laptop computer.

As further shown in FIG. 1, each of client devices 102a and 102b can include a client agent 104a and 104b respectively, herein collectively referred to as client agent 104. Client agent 104 can be configured to provide an interface to facilitate remote access to one or more resources hosted at or by, for example, a remote computing device 106. In certain implementations, the client devices 102a and 102b can be operably connected to the remote computing device 106 via one or more networks 108. In some examples, the network 108 can be a wired network, a wireless network, or a combination of both wired and wireless networks.

In some examples, the remote computing device 106 can execute, operate, or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft Internet Protocol telephone; an application for streaming video and/or audio; an application for facilitating real-time-data communications; a HyperText Transfer Protocol client; a File Transfer Protocol client; an Oscar client; a Telnet client; or any other set of executable instructions.

In some examples, the remote computing device 106 can execute a remote presentation services program or other program that uses a thin client or a remote-display protocol to capture display output generated by an application executing on the remote computing device and transmit the application display output to the client devices 102a and 102b for presentation to one or more device users.

In some examples, the remote computing device 106 can include a server agent that is configured to communicate with the client agent 104. The server agent can be configured to, for example, authenticate a client device, provide secure access to one or more remote and/or shared resources, monitor user interactions with the resources, update user access based upon changes to user permission levels for a client device, distribute or properly direct requests to available resources, and perform other similar distributed workspace functions.

In yet other examples, the remote computing device 106 can be configured to execute a virtual machine providing, to a user of one of client devices 102a and/or 102b, access to a computing environment. In such an example, the client device 102a and/or 102b can be a virtual machine. The virtual machine can be managed by, for example, a hypervisor, a virtual machine manager (VMM), or any other hardware virtualization technique within the remote computing device 106.

In some examples, the network 108 can be: a local area network (LAN); a metropolitan area network (MAN); a wide area network (WAN); a primary public network; and a primary private network. Additional examples can include a network 108 of mobile telephone networks that use various protocols to communicate among mobile devices. For short range communications within a wireless local-area network (WLAN), the protocols can include 802.11, Bluetooth, and Near Field Communication (NFC).

It should be noted that the specific device architecture as shown in FIG. 1 is provided by way of example only. For instance, two client devices 102a and 102b are provided by way of example only and system 100 can include additional client devices. Similarly, one remote computing device 106 is also shown by way of example only. In certain implementations, multiple remote computing devices can be operably connected to the client devices via, for example, one or more network appliances configured to perform, for example, access control and load balancing.

Figure 2B:
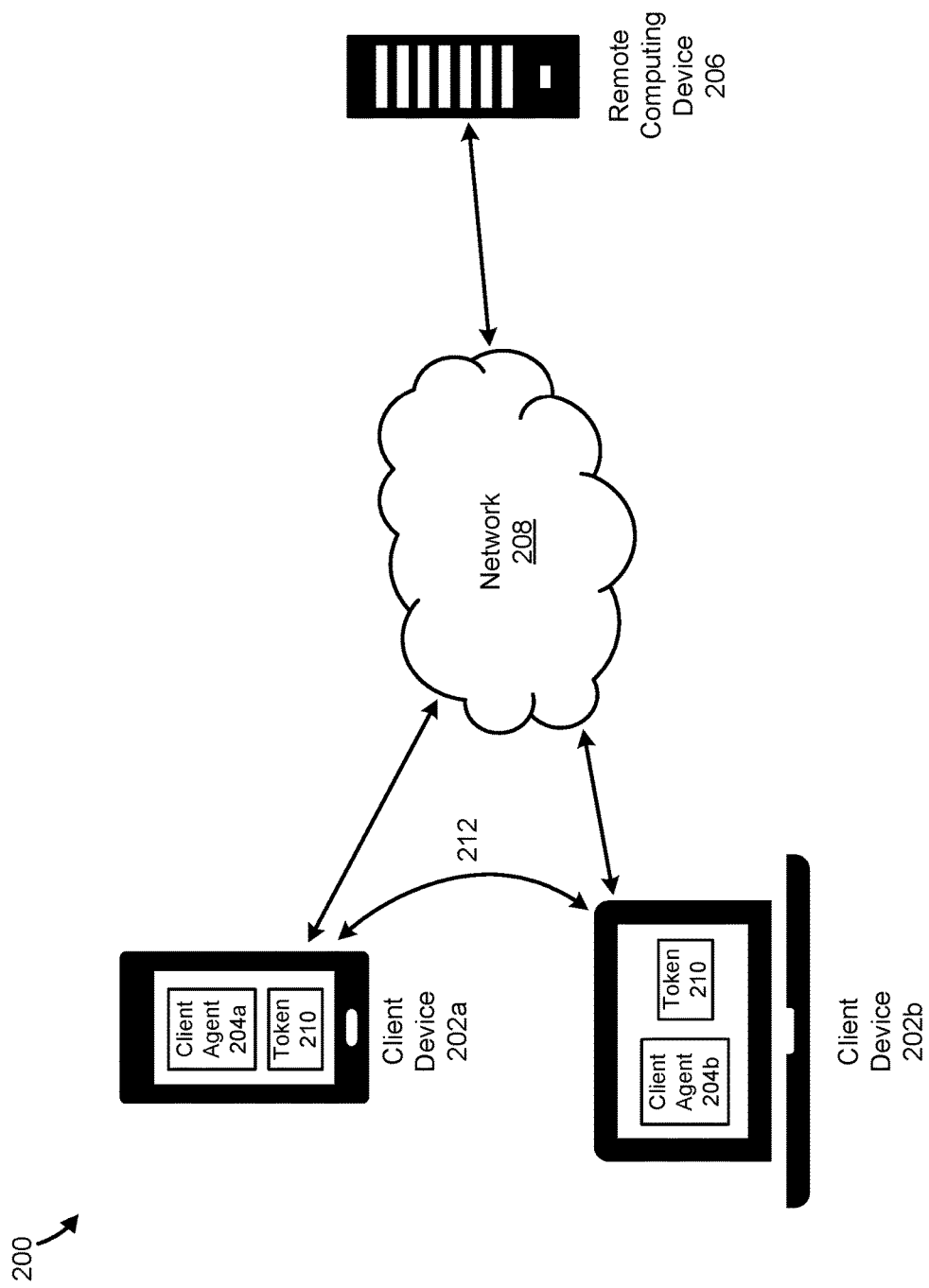

In a typical distributed workspace or remote resource system, providing secure access to each of the client devices 102a and 102b as shown in FIG. 1 would require two separate and distinct authentication processes for each device, even if each device is assigned to the same user. FIGS. 2A and 2B illustrate a system 200 in which a single sign-on technique as described herein is used to authenticate a user of multiple client devices belonging to or otherwise assigned to the user.

FIG. 2A illustrates a logical architecture of one implementation of, for example, a distributed workspace system 200 that is configured to connect one or more client devices with a remote computing device configured to host one or more shared resources such as applications accessible via a distributed workspace. However, in contrast to system 100 as described above, system 200 is configured to provide an improved user experience during device authentication by using a single sign-on technique as described herein.

As shown in FIG. 2A, the system 200 can include a client device 202a and a client device 202b. In this example, each of the client devices 202a and 202b belong to or otherwise assigned to the same user. For example, as shown in FIG. 2A, client device 202a can be a user's cellphone and client device 202b can be the user's laptop computer.

As further shown in FIG. 2A, each of client devices 202a and 202b can include a client agent 204a and 204b respectively, herein collectively referred to as client agent 204. Client agent 204 can be configured to provide an interface to facilitate remote access to one or more resources hosted at, for example, a remote computing device 206. In certain implementations, the client devices 202a and 202b can be operably connected to the remote computing device 206 via one or more networks 208. In some examples, the network 208 can be a wired network, a wireless network, or a combination of both wired and wireless networks.

Upon first connecting to the remote computing device 206, a first client device such as client device 202a can provide authentication information. For example, the client agent 204a can receive username and password information from the user of client device 202a and transmit this information, along with any additional information such as authorization credential information stored on the client device 202a, to the remote computing device 206 via the network 208. The remote computing device 206 can receive the authorization information, authenticate a user of the client device 202a, and provide the client device 202a with an access token 210. In certain implementations, the client agent 204a can use the access token 210 to access one or more resources hosted at or otherwise made accessible by the remote computing device 206.

As noted above, in certain situations a user may want to transition between or otherwise utilize multiple client devices to access similar remote resources. For example, the user of client device 202a may want to use client device 202b to access similar remote resources available at or made available by remote computing device 206. In such a situation, rather than repeat the authentication process from the beginning as would traditionally be done, a single sign-on technique as described herein can be used. For example, as shown in FIG. 2B, each of client devices 202a and 202b can establish a communication link 212. In some examples, the link 212 can include a direct communication link such as a Bluetooth® connection, an infrared connection, and/or an NFC link. In some examples, the link 212 can be established via a shared network such as a Wi-Fi network both client devices 202a and 202b are operably connected to.

As described herein, the client devices 202a and 202b can be configured to share information via the link 212 including single sign-on login information such that, rather than repeat the same authentication process as client device 202a, client device 202b can use a single sign-on process as described herein to receive a copy of the access token 210 from the remote computing device 206, thereby reducing the overall time and effort taken to authenticate the user when using client device 202b and increasing the productivity and efficiency of the user of both client devices 202a and 202b while decreasing the user's active participation in the authentication of the second client device 202b. Additional detail of the actual single sign-on technique and device authentication is provided in the following discussion of FIGS. 3-6B.

It should be noted that two client devices 202a and 202b are shown in FIGS. 2A and 2B by way of example only. In some examples, additional client devices can be included and authenticated using the single sign-on technique as described herein.

Sample Implementation Processes

Figure 3:
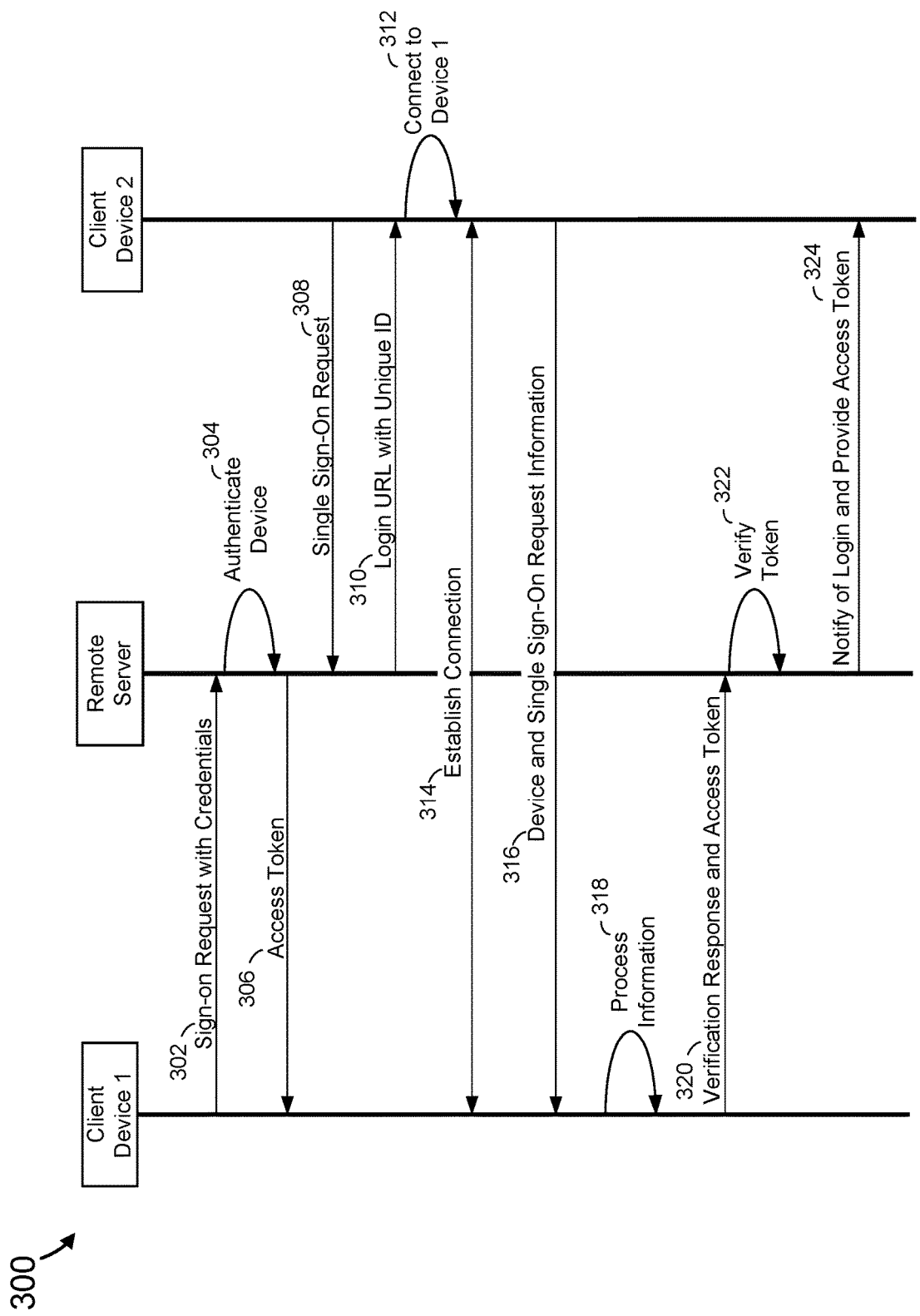
FIG. 3 is a sample sequence diagram for implementing a single sign-on process, in accordance with at least one example of the present disclosure.

FIG. 3 illustrates a sample sequence diagram 300 of a process for authenticating multiple client computing devices using a single sign-on technique as described herein. Diagram 300 as shown in FIG. 3 and described below is intended to provide an overview of the single sign-on techniques as described herein. As shown in the diagram 300, a client device 1 such as client device 202a as described above in reference to FIG. 2 can transmit 302 a sign-on request including credential information such as username and password information as well as any credential information stored on or otherwise associated with client device 1. A remote server such as remote computing device 206 as described above in reference to FIG. 2 can receive the request and authenticate 304 the information to authenticate client device 1. The remote server can transmit 306 an access token to the client device 1.

As further shown in diagram 300, a client device 2 such as client device 202b as described above in reference to FIG. 2 can transmit 308 a single sign-on request to the remote server. The remote server can process the request and transmit a single sign-on response including a uniform resource locator (URL) or other similar link and a unique session identifier as described in the discussion of, for example, FIG. 4 below. Client device 2 can process the response and establish 312 a connection to client device 1. As further shown in diagram 300, each of client device 1 and client device 2 can establish 314 a connection using, for example, a communication protocol such as Bluetooth®, infrared, NFC, or other similar communication protocols.

Once connected, client device 2 can transmit 316 device information such as a device identifier (e.g., an assigned name for the client device 2 such as "John Doe's Laptop") and the single sign-on request and response information such as the URL and unique session identifier. Client device 1 can process 318 the information and provide, for example, a confirmation request to a user of client device 1 as described, for example, in the discussion of FIG. 6B below. Client device 1 can transmit 320 a single sign-on verification response to the remote server, the verification including, for example, the unique session identifier and a copy of the access token. The remote server can verify 322 the copy of the access token and, upon verification, notify 324 client device 2 of the successful verification and login, and provide a copy of the access token to client device 2.

Additional detail of the process steps performed by the individual computing devices referenced in FIG. 3 is provided in the following discussions of FIGS. 4 and 5. For example, additional detail related to operation of the remote server is provided in the discussion of FIG. 4 below. Similarly, additional detail related to the operation of both client device 1 and client device 2 is provided in the discussion of FIG. 5 below.

It should be noted that the sequence as shown in diagram 300 is provided by way of example only. In some examples, the order of individual sequence steps can be altered and the device or process implementing an individual sequence step can be altered based upon the design and implementation of the single sign-on techniques and system as described herein.

Figure 4:
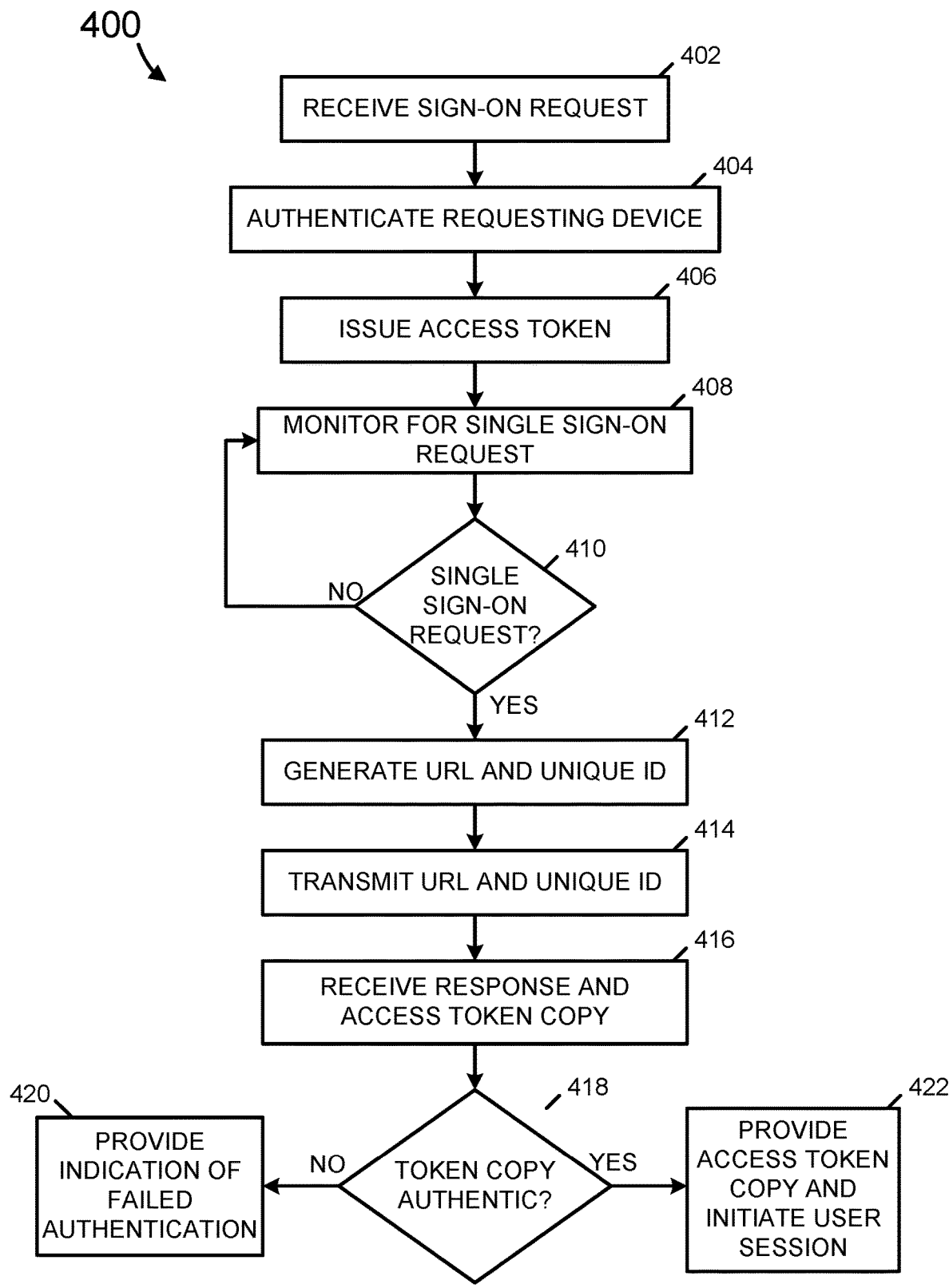
FIG. 4 is a flow diagram illustrating an overview of a process implemented by a remote computing device to facilitate a single sign-on technique, in accordance with at least one example of the present disclosure.

FIG. 4 illustrates a sample process 400 for processing a single sign-on technique for two or more client computing devices owned by or otherwise assigned to the same user. The process 400 can be implemented, for example, by a processor (e.g., processor 702 as discussed below in reference to FIG. 7) of a remote computing device (e.g., remote computing device 206 as discussed above in reference to FIGS. 2A and 2B). Similarly, the process 400 can include additional detail for one or more process steps as performed by the remote server as described above in the discussion of diagram 300 in reference to FIG. 3.

Referring to FIG. 4, a processor can receive 402 an initial sign-on request from a user of a first client computing device. The processor can authenticate 404 the user of the first client computing device. For example, the sign-on request can include authentication information such as username and password information for the requesting user, biometric information for the user such as fingerprint or facial recognition scan results, as well as and/or authentication credentials that are stored on the first computing device such as device-specific security certificates and/or other similar credential information. In some examples, the processor can authenticate 404 the user of the first client computing device using, for example, a multi-factor authentication process. For example, a multi-factor authentication process can include requesting additional information or a specific response from the user of the first client computing device in order to properly authenticate the user. In certain implementations, the processor can send an alphanumeric code to the user of the first client computing device for transmission via the first client computing device back to the processor.

Upon authentication of the user of the first client computing device, the processor can issue 406 an access token to the device. For example, the access token can include a data object that is configured to encapsulate security credential information for a computer session. The security credential information can include, for example, user identification information, user privileges, user group information, user access information, and other similar security information. The first client computing device can use the access token during a particular computing session to access resources hosted at or otherwise made accessible by the remote computing device.

As further shown in FIG. 4, the processor can monitor 408 for a single sign-on request from a second client computing device associated with the user of the first client computing device. For example, upon attempting to login into a secure environment such as a distributed workspace as described herein, the user may have the option to format the request as a single sign-on request. The processor can monitor 408 the incoming requests for, among other requests, a single sign-on request. If the processor determines 410 that no single sign-on requests have been received, the processor can continue to monitor 408 for incoming requests. However, if the processor does determine 410 that a single sign-on request has been received, the processor can process the single sign-on request.

As shown in FIG. 3, the processor can process the single sign-on request by generating 412 a URL and unique session identifier. The URL can include, for example, a link that is configured to direct a browser or other similar user interface to a specific address or location. The URL can be generated such that it directs the user interface to an address for authentication of a single sign-on request as described herein. The processor can further transmit 414 the URL and the unique session identifier to the second client computing device. The processor can receive 416 a single sign-on verification response from the first client computing device as sent to, for example, a location contained in or otherwise defined by the URL as described above. In certain implementations, the single sign-on verification response can include the unique session identifier and a copy of the access token previously issued to the first client computing device. The processor can determine 418 if the received access token copy is authentic by, for example, comparing the received access token copy to a copy of the previously transmitted access token stored locally by the processor. If the processor does not determine 418 that the access token copy is authentic, the processor can provide 420 an indication to the first client computing device and/or the second client computing device that the single sign-on authentication has failed and that the single sign-on request is denied. Conversely, if the processor determines 418 that the token is authentic, the processor can provide 422 a copy of the access token to the second client computing device and initiate a user session on the second client computing device.

In some examples, the processor can be further configured to provide an updated access token to one or more client computing devices. For example, upon determining 418 that the access token received from the first client computing device is verified, the processor can send a new or updated access token to one or both of the first client computing device and the second client computing device.

As noted above, process 400 as shown in FIG. 4 can be implemented by a processor on a remote computing device. FIG. 5 illustrates a sample process 500 showing the client-side implementation of a single sign-on technique for two or more client computing devices owned by or otherwise assigned to the same user. Various acts of the process 500 can be implemented, for example, by a processor (e.g., processor 702 as discussed below in reference to FIG. 7) of a first client computing device (e.g., client device 202a as discussed above in reference to FIGS. 2A and 2B) as well as a second processor of a second client computing device (e.g., client computing device 202b as discussed above in reference to FIGS. 2A and 2B).

Figure 5:
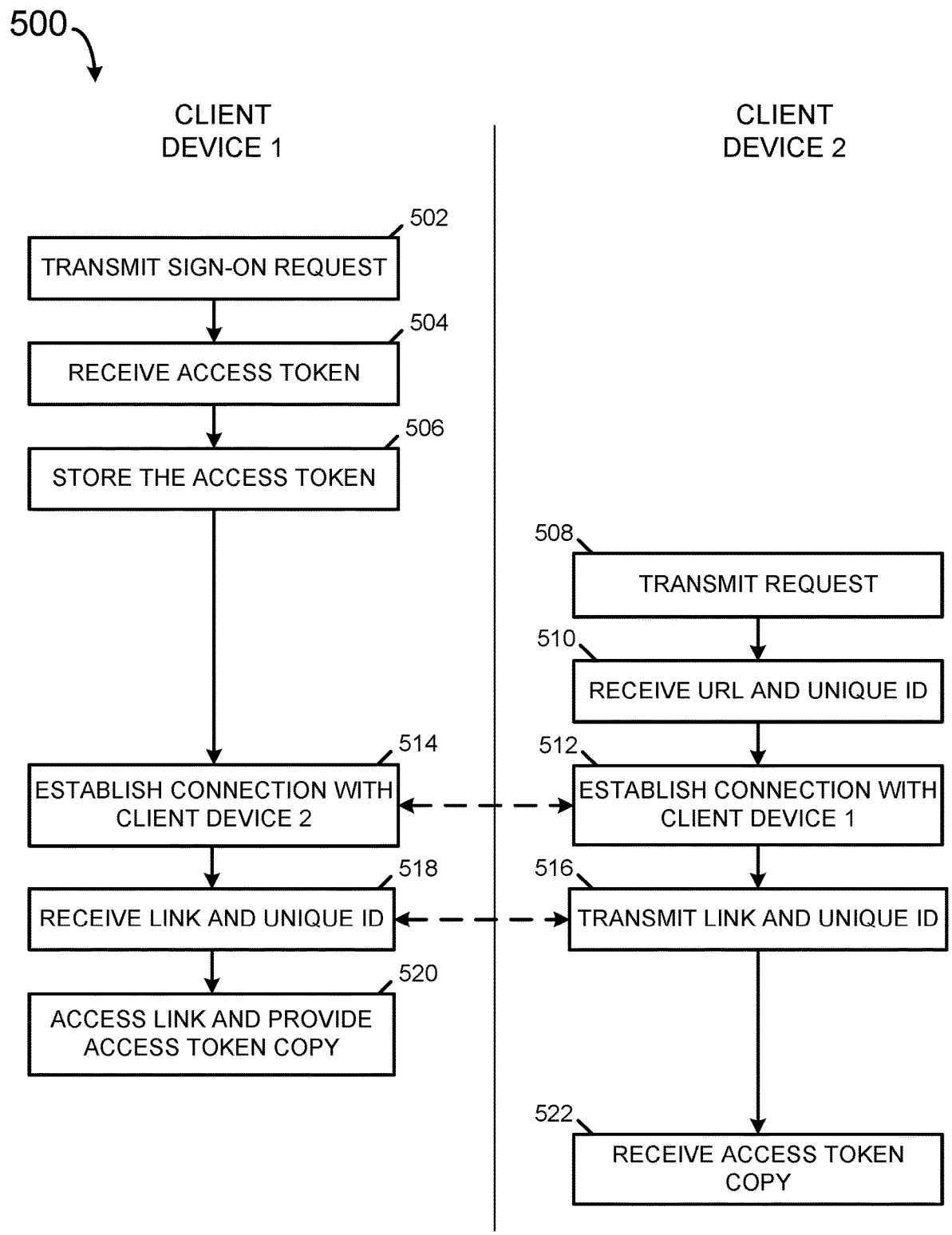
FIG. 5 is a flow diagram illustrating an overview of a process implemented by multiple client devices to facilitate a single sign-on technique, in accordance with at least one example of the present disclosure.

For example, as shown in FIG. 5, the processor of client device 1 can initially transmit 502 a sign-on request to a remote computing device for authentication of a user of the client device 1. After authentication (e.g., as shown in FIG. 4 and described above), the processor of client device 1 can receive 504 an access token. The processor of client device 1 can store 506 the access token and subsequently use the access token to access one or more remote resources hosted at or made available by, for example, the remote computing device.

As further shown in FIG. 5, the processor of client device 2 can transmit 508 a single sign-on request to the remote computing device for authentication of the user of the client device 2. For example, as noted above, the user of both client device 1 and client device 2 can select to perform an authentication procedure on client device 2 using the single sign-on techniques as described herein. After processing of the single sign-on request by the remote computing device (e.g., as shown in FIG. 4 and described above), the processor of client device 2 can receive 510 a single sign-on response from the remote computing device including, for example, a URL and unique session identifier.

Upon receiving the single sign-on response, the processor of client device 2 can establish 512 a connection with the processor of client device 1 resulting in the processor of client device 1 also establishing 514 a connection with the processor of client device 2 such that the two client devices can securely exchange information. For example, FIG. 6A as described below includes additional information about establishing a connection between client device 1 and client device 2. As described herein, the connection between client device 1 and client device 2 can include a Bluetooth® connection, an infrared connection, an NFC connection, and other similar secure connections.

As further shown in FIG. 5, the processor of client device 2 can transmit 516 the URL and unique session identifier to the processor of client device 1 via the secured communication connection. For example, the processor of client device 2 can encode or otherwise secure the information for transmission to the processor of client device 1 using one or more security protocols associated with the communication protocol used to establish the communications between client device 1 and client device 2. The processor of client device 1 can receive 518 the link and the unique session identifier. The processor of client device 1 can process the received information and, for example, provide a notification to the user of client device 1 of the single sign-on request as transmitted by client device 2. For example, FIG. 6B as described below includes additional information about the user notification of the single sign-on request. The processor of client device 1 can access 520 the URL to provide a single sign-on verification response message including, for example, the unique session identifier and a copy of the access token. After processing of the single sign-on verification response message by the remote computing device (e.g., as shown in FIG. 4 and described above), the processor of client device 2 can receive a copy of the access token. Upon receipt, the processor of client device 2 can use the access token to access one or more remote resources hosted at or made available by, for example, the remote computing device and as requested by the user of the client device 2.

It should be noted that the sample processes as shown in FIGS. 4 and 5 are provided by way of example only. Depending upon the design and implementation of the single sign-on techniques as described herein, one or more processes or process steps as shown in FIGS. 4 and/or 5 can be altered accordingly. For example, establishing the connection 512, 514 as shown in FIG. 5 is shown by way of example only. Depending upon user preferences, the connection between the two client devices can be performed at various times. For example, the connection can be established before any of the other acts of process 500. In other examples, the connection can be established after the processor of client device 2 receives 510 the link and unique session identifier as described above.

Additionally, it should be noted that, upon receiving the access token, client device 2 as shown in FIG. 5 can function as client device 1. For example, if the user wants to authenticate a third client computing device, the user can request a single sign-on for the third client computing device. The user can establish a connection between the first client computing device or second client computing device and the third client computing device for processing the single sign-on request. In such an example, the process as shown in FIG. 5 can be repeated where the second client computing device is client device 1 and the third client computing device is client device 2.

Figure 6A:
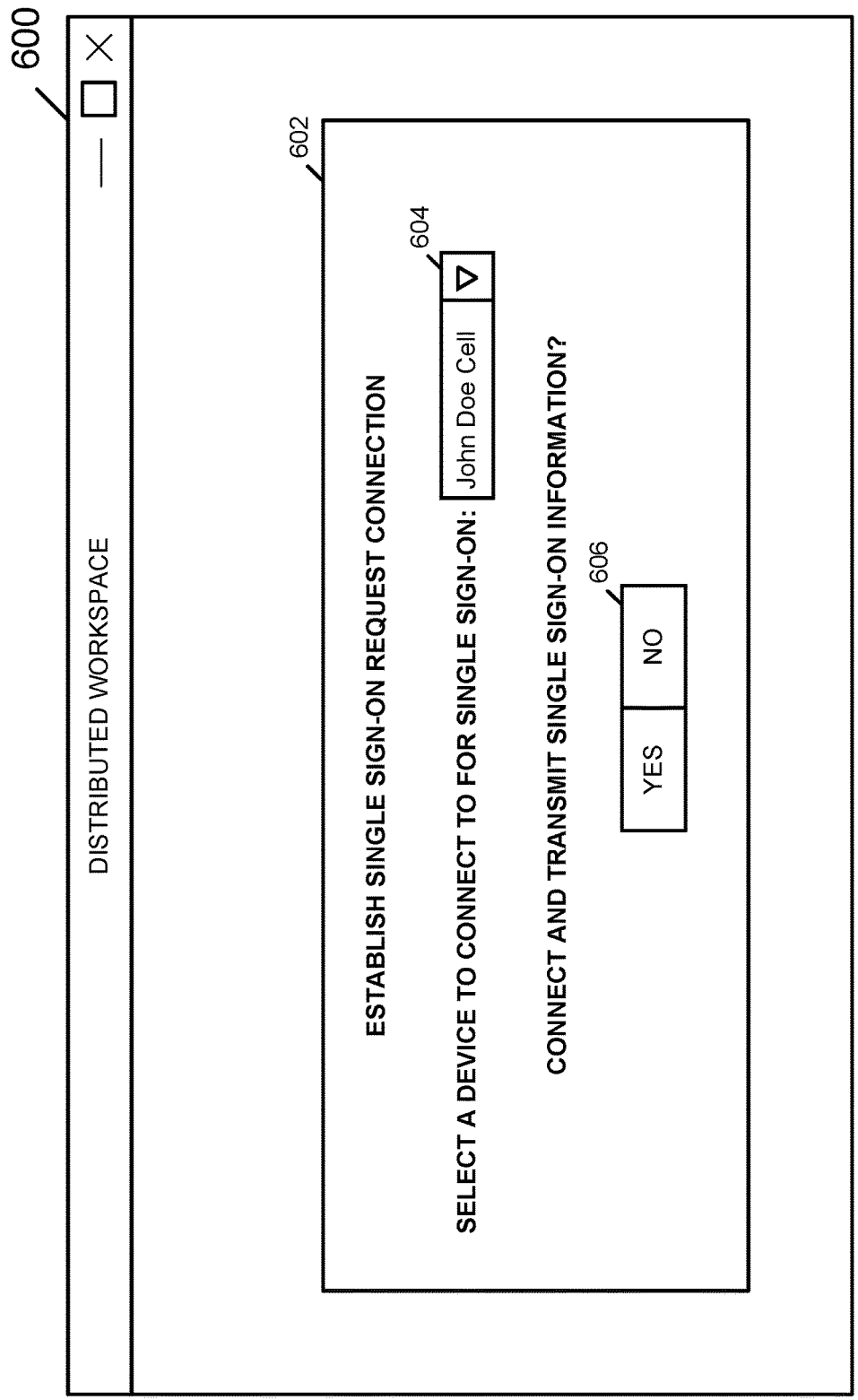
FIGS. 6A and 6B are sample user interface screens showing a single sign-on request confirmation controls, in accordance with at least one example of the present disclosure.

FIG. 6A illustrates a sample view of a user interface screen 600 that is displayed on a client computing device such as, for example, the client device 202b as described above and managed by a client agent such as, for example, client agent 204b. The client agent can be configured to manage access to remote resources hosted by, for example, remote computing device 206 as described above. As specifically shown in FIG. 6A, screen 600 illustrates a distributed workspace that includes information for processing a request for a single sign-on and, for example, establishing a connection between client device 2 and client device 1 as described above. In such an example, user interface screen 600 can be configured to be displayed or otherwise presented to the user by client device 2.

As illustrated in FIG. 6A, the screen 600 includes user interface controls 602, 604, and 606. In certain implementations, control 602 can be configured to display a text or other similarly information to a user. For example, as shown in FIG. 6A, the control 602 can include an indication that additional information is requested to establish a connection with another client device such as client device 1 as described above.

As further shown in FIG. 6A, control 604 can include an option for the user to select or otherwise enter a name of a client device to establish a connection with for processing the single sign-on request information. For example, as shown in FIG. 6A, the control 604 can include a drop down menu for providing an input to eh user to select a device name. However, it should be noted that a drop-down menu is provided by way of example only. In certain implementations, if the user has provided an indication of a client device to establish a connection with, the control 604 can receive the indication and provide a control 606 confirming the selection. For example, as shown in FIG. 6A, control 606 provides the user with affirmative and negative response options. In certain examples, the control 606 can receive a user selection of the "Yes" option, thereby confirming establishment of the device connection and transmission of the single sign-on information (e.g., the URL and unique session identifier as described herein). Conversely, if the user wants to stop the single sign-on request or has otherwise changed their mind about the request, the control 606 can receive a user selection of the "No" option, thereby canceling the single sign-on request.

Figure 6B:
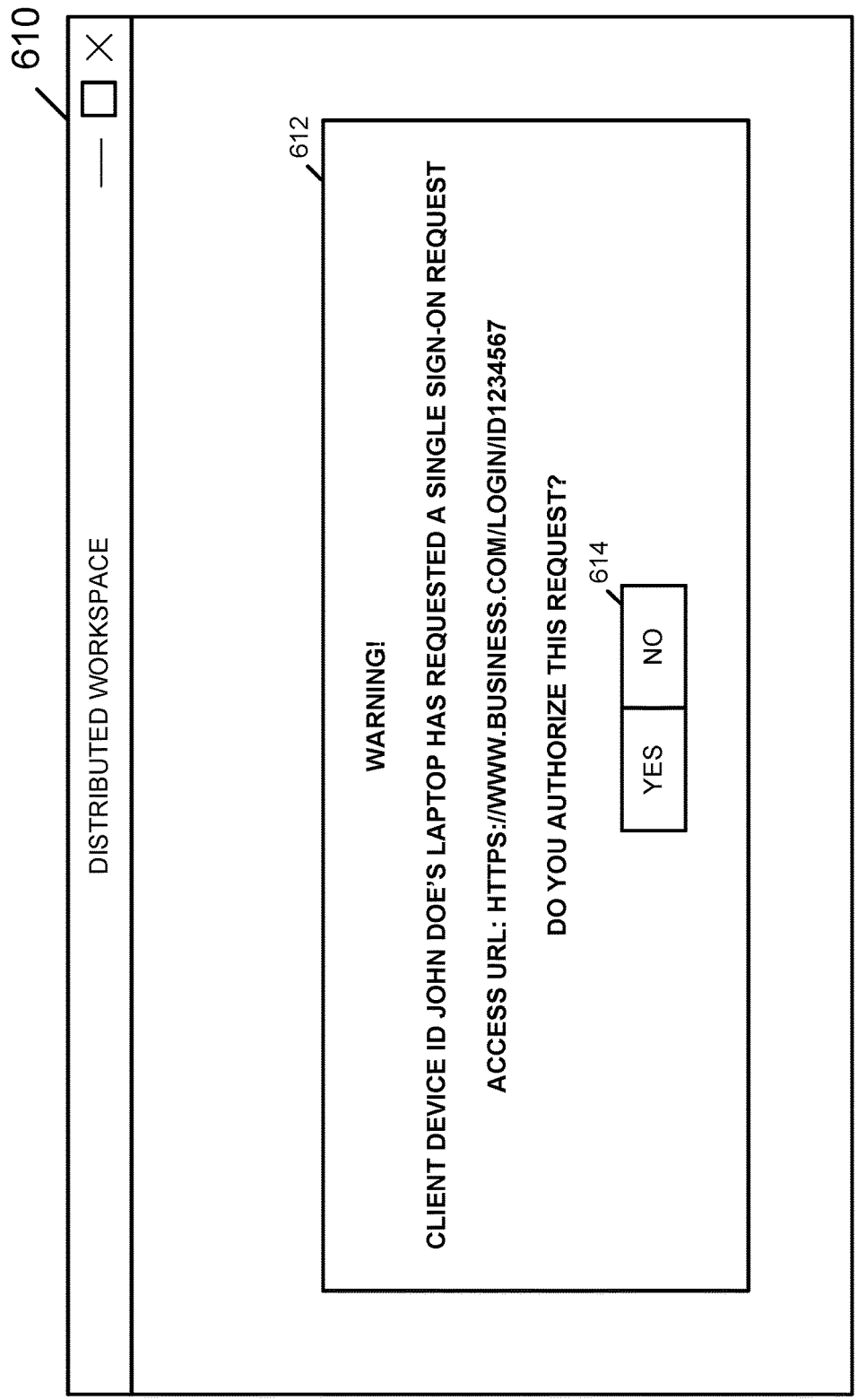

FIG. 6B illustrates a sample view of a user interface screen 610 that is displayed on a client computing device such as, for example, the client device 202a as described above and managed by a client agent such as, for example, client agent 204a. The client agent can be configured to manage access to remote resources hosted by, for example, remote computing device 206 as described above. As specifically shown in FIG. 6B, screen 610 illustrates a distributed workspace that includes a notice of a request for a single sign-on from another client computing device such as client device 2 as described above.

As illustrated in FIG. 6B, the screen 610 includes user interface controls 612 and 614. In certain implementations, control 612 can be configured to display a text or other similarly displayed alert or warning to a user. For example, as shown in FIG. 6B, the control 612 can include an alert that another client computing device has requested a single sign-on request. The control can include specific information such as the requesting device name (e.g., John Doe's Laptop as shown in FIG. 6B) as well as login in session information received from, for example, the second computing device (e.g., client device 202b as described above). For example, as shown in FIG. 6B, the login session information can include a session URL that includes a unique session ID issued by the remote computing device as described above.

As further shown in FIG. 6B, control 614 can include an option for the user to authorize or otherwise accept the single sign-on request. For example, if the user has requested the single sign-on request fora second user device, the control 614 can receive a user selection of the "Yes" option, thereby confirming the single sign-on request. Conversely, if the user has not requested the single sign-on request or has otherwise changed their mind about the request, the control 614 can receive a user selection of the "No" option, thereby canceling the single sign-on request.

Hardware Implementation Examples

Figure 7:
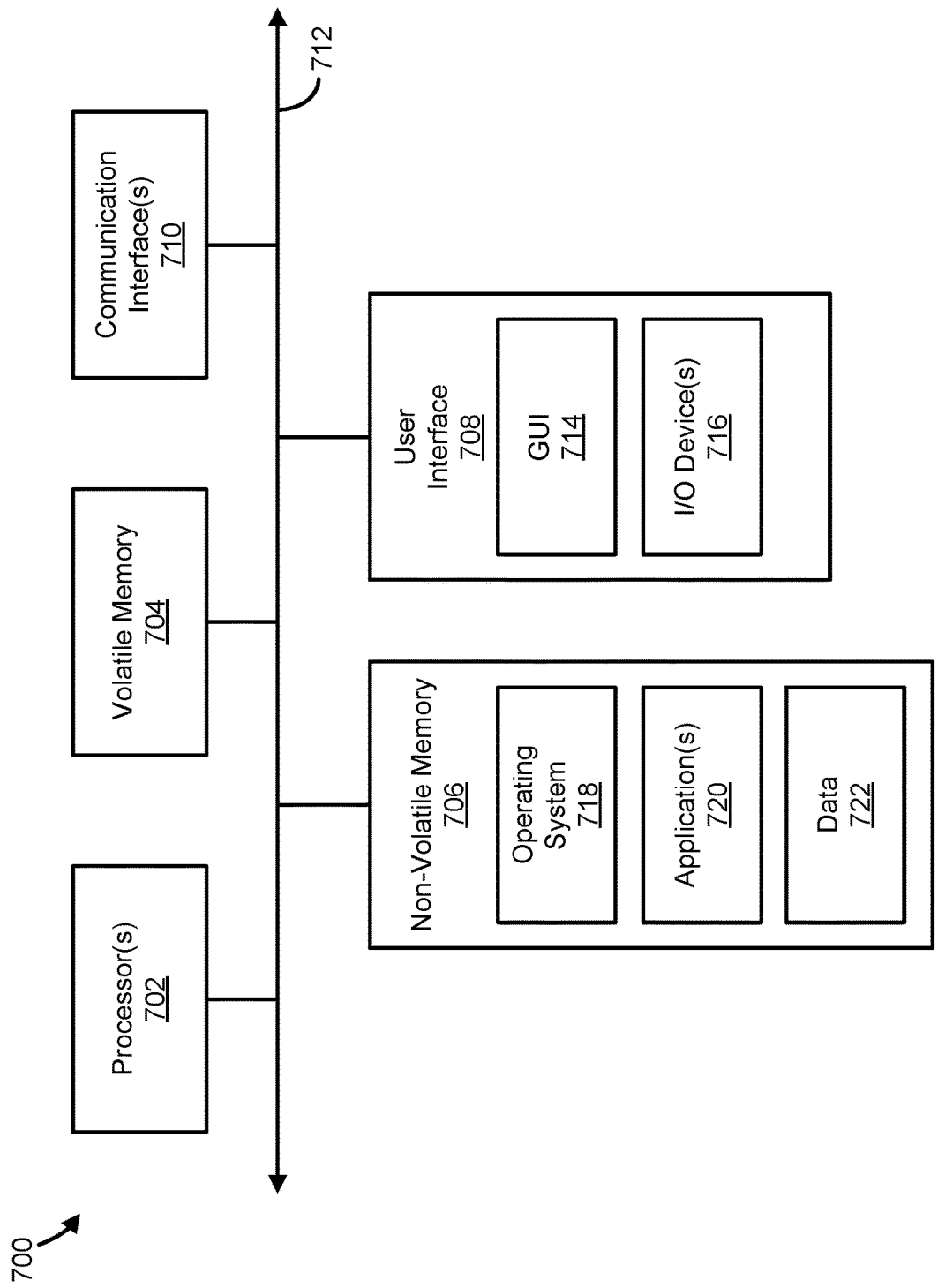
FIG. 7 is a block diagram of a computing device that can implement one or more of the computing devices of FIGS. 1, 2A, and/or 2B, in accordance with at least one example of the present disclosure.

FIG. 7 depicts a block diagram of a computing device 700 useful for practicing an example of client devices 202a and 202b and/or remote computing device 206 as described above. The computing device 700 includes one or more processors 702, volatile memory 704 (e.g., random access memory (RAM)), non-volatile memory 706, user interface (UI) 708, one or more communications interfaces 710, and a communications bus 712. One or more of the computing devices 700 can also be referred to as a computer system.

The non-volatile memory 706 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 708 can include a graphical user interface (GUI) 714 (e.g., a touchscreen, a display, etc.) and one or more input/output (I/O) devices 716 (e.g., a mouse, a keyboard, a microphone, one or more speakers, one or more cameras, one or more biometric scanners, one or more environmental sensors, and one or more accelerometers, etc.).

The non-volatile memory 706 can store an operating system 718, one or more applications 720, and data 722 such that, for example, computer instructions of the operating system 718 and/or the applications 720 are executed by processor(s) 702 out of the volatile memory 704. In some examples, the volatile memory 704 can include one or more types of RAM and/or a cache memory that can offer a faster response time than a main memory. Data can be entered using an input device of the GUI 714 or received from the I/O device(s) 716. Various elements of the computing device 700 can communicate via the communications bus 712.

The illustrated computing device 700 is shown merely as an example client device or server and can be implemented by any computing or processing environment with any type of machine or set of machines that can have suitable hardware and/or software capable of operating as described herein.

The processor(s) 702 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 702 can be analog, digital or mixed. In some examples, the processor 702 can include multiple processor cores and/or multiple processors configured to provide functionality for parallel, simultaneous execution of instructions or for parallel, simultaneous execution of one instruction on more than one piece of data.

The communications interfaces 710 can include one or more interfaces to enable the computing device 1000 to access a computer network such as a Local Area Network (LAN), a Wide Area Network (WAN), a Personal Area Network (PAN), or the Internet through a variety of wired and/or wireless connections, including cellular connections.

In described examples, the computing device 700 can execute an application on behalf of a user of a client device (e.g., one or both of client devices 202*a* and 202*b* as shown in FIGS. 2A and 2B and described above). For example, the computing device 700 can execute one or more virtual machines managed by a hypervisor and accessed via, for example, a client agent (e.g., client agent 204 as shown in FIGS. 2A and 2B and described above). Each virtual machine can provide an execution session within which applications execute on behalf of a user or a client device, such as a hosted desktop session. The computing device 700 can also execute a terminal services session to provide a distributed workspace environment. The computing device 700 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A computer system for providing a single sign-on for authenticating a user via multiple client devices in a distributed resource environment, the system comprising:
a memory;
a network interface; and
at least one processor coupled to the memory and the network interface and configured to:
receive, via the network interface, a single sign-on connection request from a requesting client device,
process the single sign-on connection request,
transmit, via the network interface, a single sign-on response to the requesting client device in reply to the single sign-on connection request,
receive, via the network interface, a single sign-on verification from a previously authenticated initial client device,
process the single sign-on verification, and
transmit, via the network interface, a copy of an access token to the requesting client device;
wherein the at least one processor is configured to process the single sign-on connection request by being configured to:
generate unique session identifier information for the single sign-on connection request,
store the unique session identifier information in the memory, and
generate the single sign-on response based upon the unique session identifier information; and
wherein the at least one processor is configured to process the single sign-on verification by being configured to:
extract a copy of the access token from the single sign-on verification,
verify the copy of the access token,
extract session identifier response information from the single sign-on verification,
compare the extracted session identifier response information and the stored unique session identifier information, and
authenticate the user of the client device based upon verification of the copy of the access token and the comparison of the extracted session identifier response information and the stored unique session identifier information.

2. The computer system of claim 1, wherein the at least one processor is further configured to authenticate the initial client device by being configured to:
receive, via the network interface, an initial connection request from the initial client device;
process the initial connection request; and
transmit, via the network interface, the access token to the initial client device in reply to the initial connection request.

3. The computer system of claim 2, wherein the at least one processor is configured to process the initial connection request by being configured to:
extract authentication data from the initial connection request;
verify the authentication data of the user of the initial client device; and
generate the access token based upon verification of the authentication data.

4. The computer system of claim 3, wherein the authentication data comprises authentication data received from the initial client device during a multi-factor authentication process.

5. The computer system of claim 1, wherein the at least one processor is further configured to transmit, via the network interface, an updated access token to at least one of the initial client device and the requesting client device.

6. A method of providing a single sign-on for authenticating a user via multiple client devices in a distributed resource environment, the method comprising:
   receiving, by at least one processor, a single sign-on connection request from a requesting client device;
   processing, by the at least one processor, the single sign-on connection request;
   transmitting, by the at least one processor, a single sign-on response to the requesting client device in reply to the single sign-on connection request;
   receiving, by the at least one processor, a single sign-on verification from a previously authenticated initial client device;
   processing, by the at least one processor, the single sign-on verification;
   transmitting, by the at least one processor, a copy of an access token to the requesting client device;
   wherein processing the single sign-on connection request comprises:
      generating, by the at least one processor, unique session identifier information for the single sign-on connection request;
      storing, by the at least one processor, the unique session identifier information; and
      generating, by the at least one processor, the single sign-on response based upon the unique session identifier information; and
   wherein processing the single sign-on verification comprises:
      extracting, by the at least one processor, a copy of the access token from the single sign-on verification;
      verifying, by the at least one processor, the copy of the access token;
      extracting, by the at least one processor, session identifier response information from the single sign-on verification;
      comparing, by the at least one processor, the extracted session identifier response information and the stored unique session identifier information; and
      authenticating, by the at least one processor, the user of the client device based upon verification of the copy of the access token and the comparison of the extracted session identifier response information and the stored unique session identifier information.

7. The method of claim 6, further comprising authenticating, by the at least one processor, the initial client device, wherein authenticating the initial client device comprises:
   receiving, by the at least one processor, an initial connection request from the initial client device;
   processing, by the at least one processor, the initial connection request; and
   transmitting, by the at least one processor, the access token to the initial client device in reply to the initial connection request.

8. The method of claim 7, wherein processing the initial connection request comprises:
   extracting, by the at least one processor, authentication data from the initial connection request;
   verifying, by the at least one processor, the authentication data of the user of the initial client device; and
   generating, by the at least one processor, the access token based upon verification of the authentication data.

9. The method of claim 8, wherein the authentication data comprises authentication data received from the initial client device during a multi-factor authentication process.

10. The method of claim 6, further comprising transmitting, by the at least one processor, an updated access token to at least one of the initial client device and the requesting client device.

11. A non-transitory computer readable medium storing computer executable instructions to provide a single sign-on for authenticating a user via multiple client devices in a distributed resource environment, the computer executable instructions comprising instructions to:
   receive a single sign-on connection request from a requesting client device,
   process the single sign-on connection request,
   transmit a single sign-on response to the requesting client device in reply to the single sign-on connection request,
   receive a single sign-on verification from a previously authenticated initial client device,
   process the single sign-on verification, and
   transmit a copy of an access token to the requesting client device;
   wherein the instructions to process the single sign-on connection request comprise instructions to:
      generate unique session identifier information for the single sign-on connection request,
      store the unique session identifier information, and
      generate the single sign-on response based upon the unique session identifier information, and
   wherein the instructions to process the single sign-on verification comprise instructions to:
      extract a copy of the access token from the single sign-on verification,
      verify the copy of the access token,
      extract session identifier response information from the single sign-on verification,
      compare the extracted session identifier response information and the stored unique session identifier information, and
      authenticate the user of the client device based upon verification of the copy of the access token and the comparison of the extracted session identifier response information and the stored unique session identifier information.

12. The computer readable medium of claim 11, wherein the instructions further include instructions to authenticate the initial client device by being configured, the instructions to authenticate the initial client device comprising instructions to:
   receive an initial connection request from the initial client device;
   process the initial connection request; and
   transmit the access token to the initial client device in reply to the initial connection request.

13. The computer readable medium of claim 12, wherein instructions to process the initial connection request comprise instructions to:
   extract authentication data from the initial connection request;
   verify the authentication data of the user of the initial client device; and
   generate the access token based upon verification of the authentication data.

14. The computer readable medium of claim 11, wherein the instructions further comprise instructions to transmit an updated access token to at least one of the initial client device and the requesting client device.

\* \* \* \* \*